Oct. 25, 1966  G. V. WOODLING  3,280,670
HANDLE CONSTRUCTION FOR PIPE WRENCHES
Filed Feb. 8, 1965
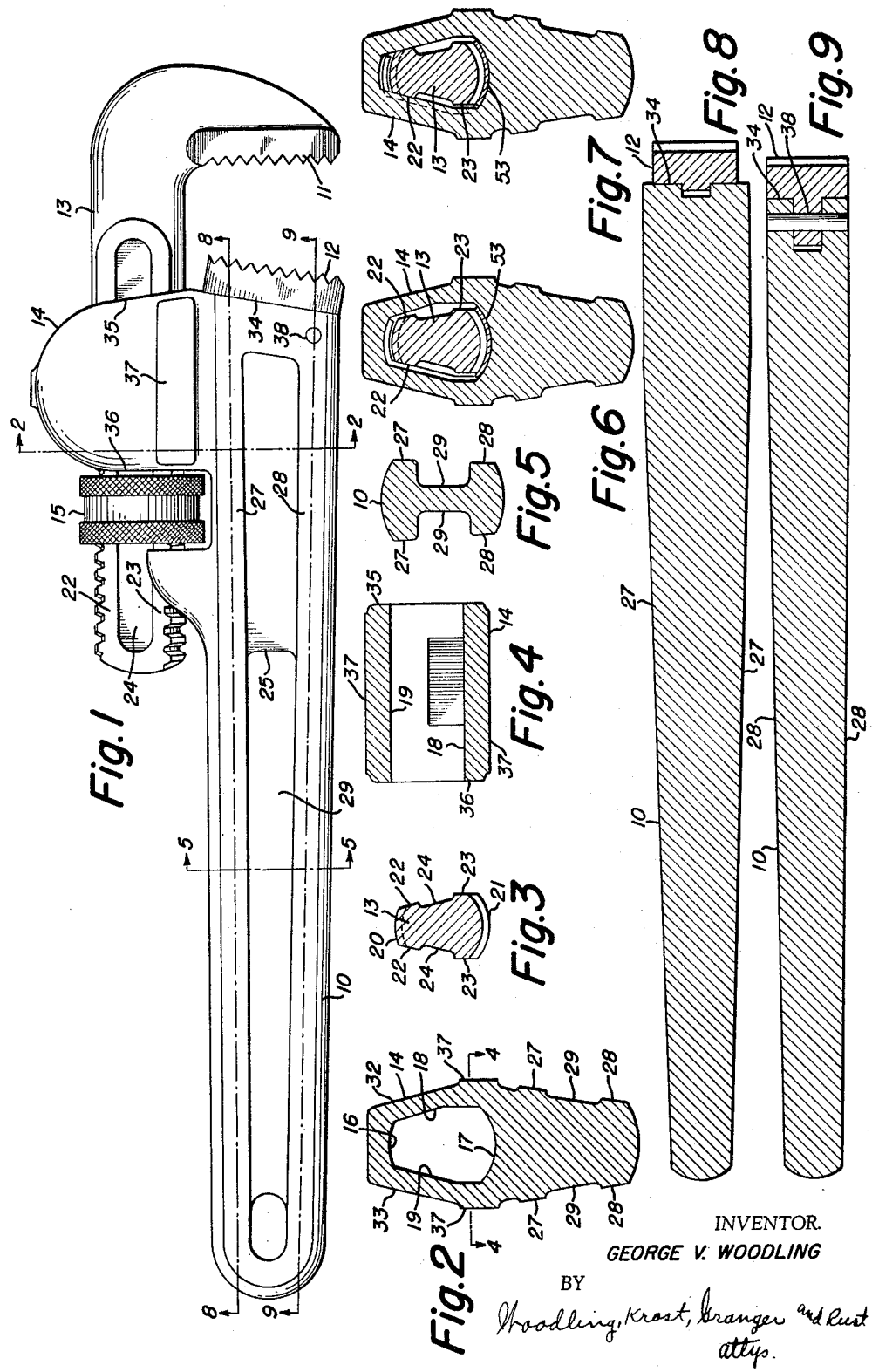
INVENTOR.
GEORGE V. WOODLING
BY
Woodling, Krost, Granger and Rust
attys.

United States Patent Office 3,280,670
Patented Oct. 25, 1966

3,280,670
HANDLE CONSTRUCTION FOR PIPE WRENCHES
George V. Woodling, 22077 W. Lake Road,
Rocky River, Ohio
Filed Feb. 8, 1965, Ser. No. 430,948
4 Claims. (Cl. 81—177)

My invention relates to improvements in a handle construction for pipe wrenches.

An object of my invention is the provision of a handle construction made of aluminum.

Another object of my invention is the provision of a handle construction which is strong and capable of withstanding the strain to which it is subjected by the hook jaw shank and the adjusting nut.

Another object is the provision of a handle having opposite sides with each side having top and bottom ribs extending longitudinally therealong.

Another object is the provision of a handle construction having a hook jaw shank housing with reinforced or thickened side walls to give strength where the strain is.

Another object is the provision of a handle construction having a hook jaw shank housing with opposite internal side walls thereof converging in a direction towards the top of the housing and confronting respectively the opposite converging sides of a hook jaw shank.

Another object is the provision of a handle construction having a hook jaw shank housing with opposite internal side walls thereof converging in a direction towards the top of the housing and confronting respectively the opposite converging sides of a hook jaw shank, wherein said opposite internal side walls of said housing have an included angle therebetween residing in a range from approximately 12 to 36 degrees.

Another object is to provide for strengthening that portion of the handle which is coextensive with the hook jaw housing.

Other objects and a fuller understanding of this invention may be had by referring to the following description and claims, taken in conjunction with the accompanying drawings, in which:

FIGURE 1 is a side view of a pipe wrench embodying the features of my invention;

FIGURES 2 and 3 are cross-sectional views taken along the line 2—2 of FIGURE 1, FIGURE 2 showing only the housing and FIGURE 3 showing only the shank;

FIGURE 4 is a cross-sectional longitudinal view taken along the line 4—4 of FIGURE 2;

FIGURE 5 is a cross-sectional view taken along the line 5—5 of FIGURE 1;

FIGURE 6 is a cross-sectional view similar to FIGURES 2 and 3 combined, with the top of the shank disposed to engage the top of the inside of the housing to limit the movements of the rocking action of the shank within the housing;

FIGURE 7 is a cross-sectional view similar to FIGURE 6, with the sloping sides of the shank disposed to engage respectively the confronting sloping sides on the inside of the housing to limit the movements of the rocking action of the shank within the housing; and FIGURES 8 and 9 are cross-sectional views respectively taken along the line 8—8 and the line 9—9 of FIGURE 1.

As illustrated, the pipe wrench may comprise a handle 10 having a hook jaw 11 and a handle jaw 12. The hook jaw 11 has a shank 13 which is mounted in a hook jaw housing 14 on the end of the handle adjacent the handle jaw 12. The housing 14 has an internal wall defining an opening through which the shank extends. The internal wall comprises top and bottom wall portions 16 and 17 and opposite side wall portions 18 and 19, see FIGURE 2. The shank 13 may be tapered and comprises an inverted substantially V-shaped cross-section, see FIGURE 3. The tapered shank is very rigid and strong, capable of withstanding the application of high torque. The tapered shank 13 is resiliently mounted for rocking action in the housing 14 which is an integral part of the handle 10. An adjusting nut 15 threadably engages the threads on the shank for securing the shank in the housing. The shank 13 is resiliently balanced in the housing for rocking action by supporting spring means including a supporting spring structure identified by the reference character 53. The shank 13 has top and bottom substantially arcuate surfaces 20 and 21 and opposite sloping side surfaces. The top and bottom arcuate surfaces 20 and 21 each comprise substantially a cylindrical segment with the bottom surface embracing a wider segment than the top surface, thereby producing the sloping side surfaces. Preferably, the sloping sides of the tapered shank 13 each comprise top and bottom ribs 22 and 23 between which there is a sunken sloping wall 24. The face of the ribs 22 may be machined or ground smooth at an angle with respect to each other whereby the included angle therebetween resides in a range of approximately 12 to 36 degrees. In FIGURE 3 of the drawing, the included angle is approximately 24 degrees. The face of the ribs 23 may also be ground smooth, but preferably parallel to each other.

The opening defined by the internal wall of the housing is sufficiently large relative to the shank to permit pivotal or rocking movement of the shank in the housing under the influence of the spring means including the supporting spring structure 53. The spring means tends to resiliently center the shank in the opening of the housing. The opposed sloping side surfaces of the ribs 22 of the shank converge in a direction towards the top of the shank, as do also the opposed sloping internal side walls 18 and 19 of the housing which confront respectively the opposed sloping side surfaces of the ribs 22 of the shank. In my invention, the confronting sloping side surfaces may (1) engage each other to limit the movements of the rocking motion of the shank within the housing (see FIG. 7) or (2) the top surface 20 of the shank may engage the top internal wall 16 of the opening to limit the movements of the rocking motion before confronting sloping side surfaces engage each other (see FIG. 6). In FIGURE 7, the confronting sloping side surfaces will not stick within each other because the included angle, to-wit: 12 to 36 degrees, is greater than a "sticking" taper which is of a value of approximately 7 degrees or less. Thus, the tapered shank may rock in the opening of the housing without "sticking." In FIGURE 6, the opposite internal side walls of the housing are spaced from the opposite side walls of the shank. The supporting spring structure is positioned between the top and bottom surfaces of the shank and the top and bottom wall portions respectively of the internal wall of the opening. Thus, the top and bottom surfaces of the shank and the supporting spring structure engage the top and bottom wall portions of the internal wall of the housing to limit the movements of the rocking motion of the shank within the housing.

The handle 10 has opposite sides with each side having top and bottom ribs 27 and 28 extending longitudinally thereof with a sunken wall or web 29 therebetween. In that portion of the handle which is coextensive with the housing 14, the sunken wall or web 29 is made thicker (see FIG. 2) to give strength where the maximum strain is. The sunken wall or web 29 becomes thicker at a place in advance of the nut 15, as indicated by the reference character 25. The housing projects upwardly from the handle and has opposite external side walls 32 and 33 with each side wall extending upwardly from the top ribs 27 of the handle. As shown in FIGURE 1, the handle has a terminal abutment wall 34 against which the handle jaw 12 abuts and to which it is attached by a rivet 38. The right-hand end of the housing has a front wall 35 extending upwardly from the handle and constitutes a terminal end wall which is substantially a continuation of the terminal abutment wall 34. The left-hand end of the housing has a rear wall 36 extending upwardly from the handle and constitutes a pressure wall engageable by the adjusting nut 15. The bottom internal wall 17 of the opening of the housing is positioned at a level above the top ribs 27 of the handle. The opposite internal side walls 18 and 19 of the opening of the housing and the opposite external side walls 32 and 33 of the housing define the wall thickness of the housing. As shown in FIGURES 1 and 2, the opposite external side walls 32 and 33 respectively of the housing have a reinforcing section 37 which extends longitudinally thereof at a level substantially opposite the level where the bottom internal wall 17 of the opening meets the internal side walls 18 and 19 of the housing to provide an increased thickness in the walls of the housing at these junctures for withstanding the strain to which the housing is subjected by the shank and the adjusting nut.

As shown by a comparison between FIGURES 8 and 9, the top ribs 27 of the handle are spaced apart for a distance greater than the bottom ribs 28 are spaced apart in the region where the top and bottom ribs are substantially coextensive with the housing. This provides for greater strength.

The handle and housing construction is strong where the action is. In this regard, see the cross-sectional view of FIGURE 2 where most of the strain is concentrated. Preferably, the handle and the housing are made of aluminum and of one integral piece. The supporting spring means including the supporting spring structure 53 may be the same as that shown and described in my co-pending patent application filed February 8, 1965, Serial No. 430,982, entitled Supporting Spring Structure for Pipe Wrenches.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A handle construction for a pipe wrench having a handle jaw and a hook jaw including a shank and an adjusting nut surrounding and threadably engaging the shank, said handle construction being made of aluminum and comprising a handle having at one end thereof a housing provided with an internal wall defining an opening extending therethrough to receive said shank, said handle having opposite sides with each side having top and bottom ribs extending longitudinally therealong with a sunken web therebetween, said housing projecting upwardly from said handle and having opposite external side walls with each side wall extending upwardly from a top rib of the handle, said handle having a terminal abutment wall against which said handle jaw abuts, said housing having a front wall extending upwardly from said handle and constituting a terminal end wall and being substantially a continuation of said terminal abutment wall, said housing having a rear wall extending upwardly from said handle and constituting a pressure wall engageable by said adjusting nut, said internal wall of said housing including top and bottom internal walls and opposite internal side walls, said bottom internal wall positioned at a level above said top ribs of said handle, said opposite internal side walls and said opposite external side walls of said housing defining the wall thickness of said housing, said sunken web in a region where it is coextensive with said housing having a thicker wall section than the remaining portion of the web of the handle.

2. The structure as claimed in claim 1, wherein said shank has an inverted substantially V-shaped cross-section with opposite sides thereof converging in a direction towards the top of said shank, said opposite internal side walls of said housing converging in a direction towards the top of said housing and confronting said opposite sides of said shank, said opposite sides of said shank engaging said opposite internal side walls of said housing and having an included angle between said sides residing in a range from approximately 12 to 36 degrees.

3. The structure as claimed in claim 1, wherein said opposite external side walls of said housing each have a reinforcing section extending longitudinally thereof and at a level substantially opposite the level where said bottom internal wall meets said internal side walls to provide an increased thickness to the walls of said housing at said junctures to withstand the strain to which said housing is subjected by said shank and adjusting nut.

4. The structure as claimed in claim 1, wherein said shank has an inverted substantially V-shaped cross-section with opposite sides thereof converging in a direction towards the top of said housing and being spaced from said opposite sides of said shank, a supporting spring structure engaging the top and bottom internal walls of said housing, said shank having top and bottom surfaces respectively engaging said supporting spring structure to limit the movements of the rocking motion of the shank within the housing.

References Cited by the Examiner

UNITED STATES PATENTS

| | | | |
|---|---|---|---|
| 1,711,083 | 4/1929 | Brungardt | 81—177 |
| 2,192,702 | 3/1940 | Wright | 81—101 |
| 2,656,751 | 10/1953 | Johnson et al. | 81—177 X |
| 2,742,809 | 4/1956 | Brynge et al. | 81—101 |
| 3,015,246 | 1/1962 | Buyer | 81—167 |

FOREIGN PATENTS 554,499  3/1923  France.

WILLIAM FELDMAN, *Primary Examiner.*

MILTON S. MEHR, *Examiner.*